(12) United States Patent
Paielli

(10) Patent No.: US 7,650,232 B1
(45) Date of Patent: Jan. 19, 2010

(54) TRAJECTORY SPECIFICATION FOR HIGH CAPACITY AIR TRAFFIC CONTROL

(75) Inventor: Russell A. Paielli, San Jose, CA (US)

(73) Assignee: The United States of America as represented by the Administrator of the National Aeronautics and Space Administration (NASA), Washington, DC (US)

(*) Notice: Subject to any disclaimer, the term of this patent is extended or adjusted under 35 U.S.C. 154(b) by 117 days.

(21) Appl. No.: 11/239,456

(22) Filed: Sep. 22, 2005

(51) Int. Cl.
- *G05D 1/10* (2006.01)
- *G01C 21/00* (2006.01)
- *G08G 5/04* (2006.01)

(52) U.S. Cl. .................. 701/205; 340/963; 340/977; 340/978; 340/979

(58) Field of Classification Search .................. 701/205
See application file for complete search history.

(56) References Cited

U.S. PATENT DOCUMENTS

| | | | | |
|---|---|---|---|---|
| 2,472,129 | A * | 6/1949 | Streeter, Jr. | 244/189 |
| 3,118,059 | A * | 1/1964 | Vago | 701/205 |
| 3,185,981 | A * | 5/1965 | Bath et al. | 342/100 |
| 3,214,575 | A * | 10/1965 | Seliger et al. | 701/220 |
| 3,414,901 | A * | 12/1968 | Perkins et al. | 342/401 |
| 3,755,817 | A * | 8/1973 | Wipff et al. | 342/464 |
| 3,777,123 | A * | 12/1973 | Games | 701/207 |
| 3,787,809 | A * | 1/1974 | Cooper | 342/422 |
| 4,021,009 | A * | 5/1977 | Baker et al. | 244/180 |
| 4,063,073 | A * | 12/1977 | Strayer | 701/120 |
| 4,214,482 | A * | 7/1980 | Bouchard | 73/504.09 |
| 4,402,049 | A * | 8/1983 | Gray | 701/205 |
| 4,608,641 | A * | 8/1986 | Snell | 701/4 |
| 4,825,374 | A * | 4/1989 | King et al. | 701/5 |
| 4,999,782 | A * | 3/1991 | BeVan | 701/206 |
| 5,008,825 | A * | 4/1991 | Nadkarni et al. | 701/4 |
| 5,050,086 | A * | 9/1991 | Lambregts | 701/4 |
| 5,157,615 | A * | 10/1992 | Brodegard et al. | 701/301 |
| 5,233,524 | A * | 8/1993 | Jackson | 701/3 |
| 5,343,395 | A * | 8/1994 | Watts | 701/16 |
| 5,355,316 | A * | 10/1994 | Knobbe | 701/220 |

(Continued)

OTHER PUBLICATIONS

A Flight Investigation of a 4D Area Navigation System Concept for Stol Aircraft in the Terminal Area. Frank Neuman, David N. Warner, and Francis J. Moran. NASA Technical Memorandum. NASA TM X-73,195. Mar. 1977.*

(Continued)

*Primary Examiner*—Eric Bolda
*Assistant Examiner*—Ari M Diacou
(74) *Attorney, Agent, or Firm*—John F. Schipper; Robert M. Padilla

(57) ABSTRACT

Method and system for analyzing and processing information on one or more aircraft flight paths, using a four-dimensional coordinate system including three Cartesian or equivalent coordinates (x, y, z) and a fourth coordinate δ that corresponds to a distance estimated along a reference flight path to a nearest reference path location corresponding to a present location of the aircraft. Use of the coordinate δ, rather than elapsed time t, avoids coupling of along-track error into aircraft altitude and reduces effects of errors on an aircraft landing site. Along-track, cross-track and/or altitude errors are estimated and compared with a permitted error bounding space surrounding the reference flight path.

8 Claims, 8 Drawing Sheets

U.S. PATENT DOCUMENTS

| | | | |
|---|---|---|---|
| 5,369,589 A * | 11/1994 | Steiner | 701/200 |
| 5,505,410 A * | 4/1996 | Diesel et al. | 244/195 |
| 5,592,382 A * | 1/1997 | Colley | 701/207 |
| 5,646,854 A * | 7/1997 | Bevan | 701/206 |
| 5,745,054 A * | 4/1998 | Wilkens | 340/972 |
| 5,774,818 A * | 6/1998 | Pages | 701/3 |
| 5,797,106 A * | 8/1998 | Murray et al. | 701/11 |
| 5,925,079 A * | 7/1999 | Peyrucain et al. | 701/4 |
| 6,057,786 A * | 5/2000 | Briffe et al. | 340/975 |
| 6,092,007 A * | 7/2000 | Cotton et al. | 701/4 |
| 6,112,141 A * | 8/2000 | Briffe et al. | 701/14 |
| 6,134,500 A * | 10/2000 | Tang et al. | 701/202 |
| 6,285,954 B1 * | 9/2001 | Mark et al. | 701/221 |
| 6,304,800 B1 * | 10/2001 | Ishihara et al. | 701/16 |
| 6,377,889 B1 * | 4/2002 | Soest | 701/207 |
| 6,405,124 B1 * | 6/2002 | Hutton | 701/200 |
| 6,519,527 B2 * | 2/2003 | Shinagawa | 701/209 |
| 6,522,958 B1 * | 2/2003 | Dwyer et al. | 701/3 |
| 6,571,155 B2 * | 5/2003 | Carriker et al. | 701/3 |
| 6,600,991 B1 * | 7/2003 | Jardin | 701/206 |
| 7,046,432 B2 * | 5/2006 | Starodoumov | 359/341.32 |
| 7,219,011 B1 * | 5/2007 | Barber | 701/205 |

OTHER PUBLICATIONS

Weisstein, Eric W. "Point-Line Distance—3-Dimensional." From MathWorld—A Wolfram Web Resource. http://mathworld.wolfram.com/Point-LineDistance3-Dimensional.html. Uploaded Jun. 6, 2002, Downloaded Nov. 2, 2007.*

Erzberger, et al., 4D Guidance System Design With Application to STOL Air Traffic Control, 13th Joint automatic Control Conference, Stanford, CA, Aug. 16-18, 1972, 445-454, AIAA.

* cited by examiner

TRAJECTORY SPECIFICATION FOR HIGH CAPACITY AIR TRAFFIC CONTROL

ORIGIN OF THE INVENTION

This invention was made, in part, by one or more employees of the U.S. government. The U.S. government has the right to make, use and/or sell the invention described herein without payment of compensation therefor, including but not limited to payment of royalties.

CROSS REFERENCE TO RELATED APPLICATIONS

FIELD OF THE INVENTION

This invention relates to control of aircraft traffic through specification of trajectory coordinates.

BACKGROUND OF THE INVENTION

Use of a four-dimensional description of an aircraft trajectory, involving three Cartesian coordinates (x, y, z) and elapsed time t, was proposed in 1972 by H. Erzberger and T. Pecsvaradi ("4D Guidance System Design With Application To STOL Air Traffic Control", $13^{th}$ Joint Automatic Control Confer., Stanford, Calif. Aug. 16-18, 1972, pp. 445-442) and has been considered by many other workers since then. One potential problem with use of (flight) time as a fourth coordinate is that an along-track error couples into aircraft altitude. In this approach, when an elapsed time specified by flight plan coordinates is reached or exceeded, an aircraft may be required to land many miles short of, or many miles beyond, its destination. Alternatively, failure of an air traffic management (ATM) ground computer could abruptly deposit responsibility for safe separation of aircraft proceeding along the same general route onto human air traffic controllers (ATCs). One ultimate goal of an automated ATM system is to remove, or minimize reliance on, ATCs from active participation in maintenance of separation between aircraft.

What is needed is a method and system for specification of an aircraft trajectory in terms of coordinates that (1) allow use of higher capacity of traffic in a given volume of airspace, (2) define bounds on allowable along-track, cross-track and vertical errors, and (3) compensate for deviations from a time schedule so that an aircraft is not required to fly with unrealistic velocity or unrealistic angle parameters and is not required to execute a landing procedure at a location that is spaced far apart from a destination location. The approach should allow for in-flight changes in flight parameters to take account of a changed environment.

SUMMARY OF THE INVENTION

These needs are met by the invention, which provides a four-dimensional location coordinate system, for example, (x, y, z, δ), where δ is not elapsed time but is a measured or calculated distance along an aircraft flight path. Along-track error, cross-track error and altitude error are calculated relative to an ideal, conflict-free reference flight path. Elapsed time is monitored and used as an independent variable for computing or measuring along-track, cross-track and altitude locations and errors. An error tube is numerically constructed around a central axis, such as the conflict-free reference flight path, with an along-track range ΔAT, a cross-track range ΔCT and an altitude range ΔAL that may vary with the distance δ along the reference flight path. Altitude is preferably specified as a function of along-track distance δ, rather than as a function of time t.

DESCRIPTION OF BEST MODES OF THE INVENTION

Figure 1:
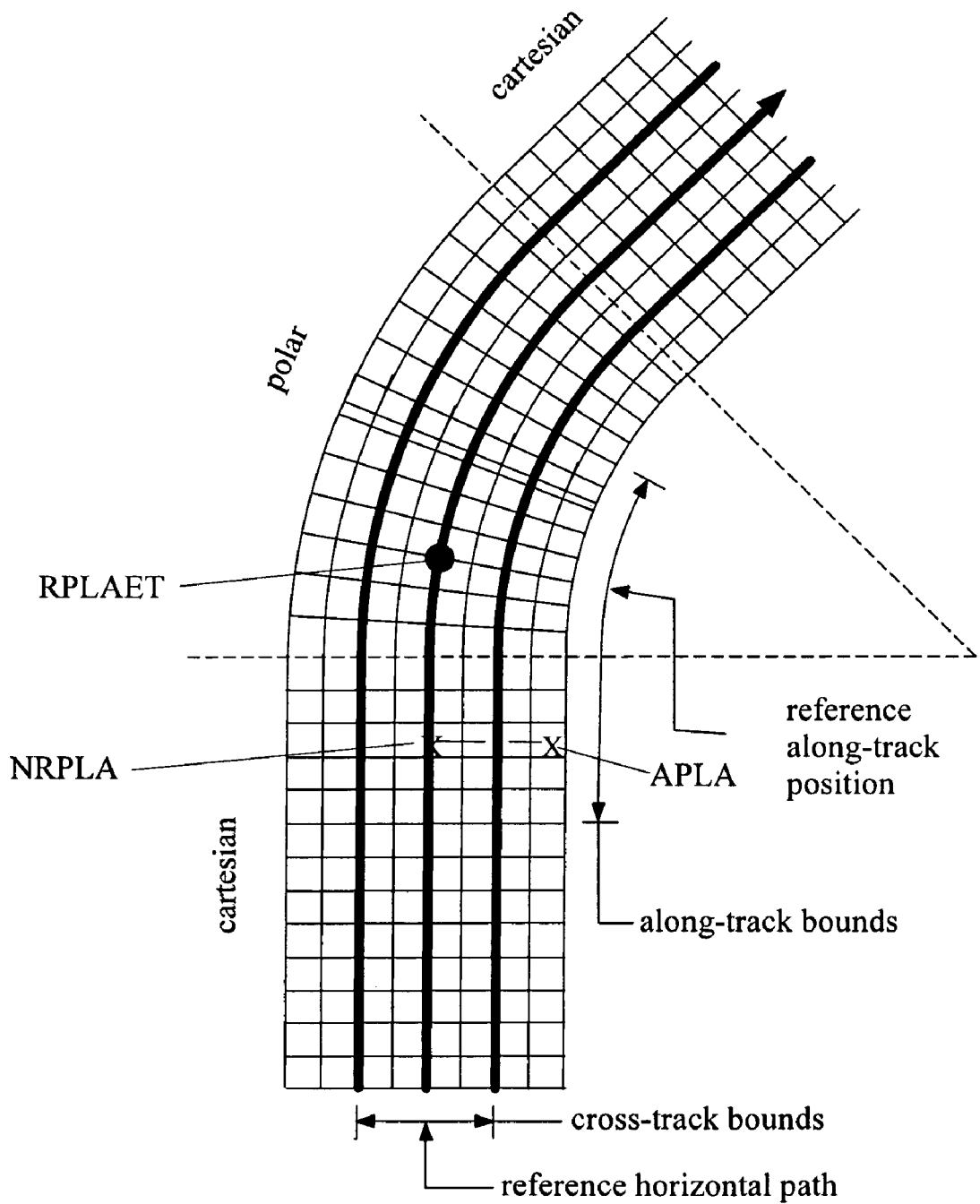
FIG. 1 illustrates a curvilinear segment of, and grid for, a flight path during an aircraft turn.

A trajectory specification used in the approach disclosed here will be used for communicating trajectory information between an aircraft and one or more ground systems, such as an Airline Operation Center (AOC), for scheduling, maintaining aircraft separation and other relevant activities. The trajectory specification has several requirements. The specification:

(i) should be able to precisely specify any "reasonable" 4D assigned trajectory,
(ii) should be able to precisely specify error tolerances relative to the assigned trajectory,
(iii) should be based on a global earth-fixed coordinate system,
(iv) should be parametric and reasonably compact,
(v) should be based on a text format readable by humans, and
(vi) should be suitable for an international standard.

The first requirement is that the format be able to precisely specify any "reasonable" 4D trajectory (3D location as a function of time). A unique 3D location must be precisely determined at each point in time, and the set of specifiable trajectories must not be unreasonably restrictive. Efficient climbs and descents must be allowed, for example, and turns must be allowed during climb and descent. The horizontal path will be restricted to straight (great circle) segments connected by turns of constant radius to simplify computations and conformance monitoring. These restrictions should not significantly limit practical routing flexibility. Note that wind optimal routes can be approximated with sufficient accuracy for practical purposes using great circle segments of, say, 100 to 200 nautical miles (nmi) in length, depending on the length of the flight. More general horizontal path segment types can be added later if desired.

The format should also have an ability to specify error tolerances for the flight technical error in each of the three axes: along-track (AT), cross-track (CT), and altitude or vertical (ALT). The error tolerances will precisely determine a 3D bounding space in which the aircraft is required to be contained at any point in time. Those bounds will be the key to assuring that the minimum required separation is maintained at all times without the attention of a human controller. If an aircraft fails to conform, or is expected to fail shortly its status will be temporarily downgraded to unequipped; and if necessary it will be automatically issued a basic heading or altitude resolution advisory (by a system that is outside the scope of this disclosure). After the situation is under control, the aircraft will either reacquire a new assigned trajectory or be handed off to a human controller for conventional separation monitoring until it is able to reacquire a new assigned trajectory.

Trajectories will be synthesized to guarantee the minimum required separation for a specified period of time called the conflict time horizon, which could be perhaps fifteen minutes. A key point is that, if the trajectories are correctly synthesized, conformance by any two aircraft will guarantee the minimum required separation distance between the aircraft for a specified period of time, regardless of where each aircraft is within its own bounding space. Otherwise stated, the bounding spaces themselves will always maintain the minimum required separation. Note that minimum separation standards are specified ir terms of the separation distance between aircraft, regardless of velocities or higher-order dynamics. Hence, the trajectory error tolerances will also be specified in terms of distance or length, as a measurement unit. Velocity and acceleration can affect future conformance, but actual present conformance will not depend on these quantities. Nevertheless, a conformance monitoring system is free to use velocity and acceleration to attempt to predict imminent nonconformance.

In the current air traffic system, standard navigational conformance bounds of ±4 nautical miles (nmi) in cross-track (CT) defines a lane width of 8 nmi. However, these bounds are routinely violated for various reasons, such as loose piloting or controllers issuing heading "vectors" but not entering them into the system. In the vertical or altitude (ALT) axis, conformance bounds apply only in level flight, and no bounds apply in the along-track (AT) axis, except arrival time constraints. The lack of rigorous conformance bounds in a conventional system makes conformance monitoring a "fuzzy" problem, which Reynolds and Hansman ("Investigating Conformance Monitoring Issues In Air Traffic Control", ICAT-2003-5, Intl. Center for Air Transportation, M.I.T., November 2003) have attempted to solve using fault detection methods. However, conformance monitoring is precisely defined if conformance bounds are based on location only and are specified precisely. The more difficult and "fuzzy" problem is the detection of faults that could lead to imminent non-conformance, and that is where Reynolds and Hansman approach may still apply.

The error tolerances will be based on Required Navigation Performance (RNP) specifications, but these tolerances could be relaxed in sparse traffic. Because wind velocities cannot be modeled exactly, the most challenging axis for which to set tolerances is the AT axis. Tightening the AT tolerance increases airspace capacity, but it also increases the probability that aircraft will be required to fly at inefficient or unrealistic airspeeds. Along-track location error tolerances must be set as a compromise between those two effects. For more flexibility, AT location error will be allowed to vary linearly with time. Also, the assigned (reference) AT location and velocity will be updated periodically to compensate for errors in modeling and prediction of AT wind magnitudes, but only when doing so does not result in a conflict. The management of AT location assignments and tolerances will be discussed in more detail in the following.

A third requirement is that the format be based on a global, earth-fixed coordinate system, which will provide a common reference. Local coordinate systems, such as the (pseudo-Cartesian) stereographic projection used within each Air Route Traffic Control Center (ARTCC), are inappropriate for enroute monitoring because these coordinate systems are each valid only within one Center. The complexity of switching coordinate systems for each Center would be unnecessarily complicated. The standard WGS84 geodetic coordinate system (latitude, longitude, and altitude) will be used as the reference coordinate system for enroute airspace. Use of a local coordinate system may be convenient in a terminal area, however, and this option will also be available. Also, a curvilinear flight path coordinate system is introduced for specifying and monitoring the flight technical error tolerances.

A fourth item in the requirements list is that the format be parametric and reasonably compact. A continuous 4D trajectory can be approximated by a simple sequence of discrete 4D points (x, y, z, t), but such an approach tends to be inefficient in terms of storage and use of bandwidth. This discrete approach also fails to capture the structure of the trajectory. Real trajectories consist of discrete segment types, such as climb at constant CAS (Calibrated Airspeed), cruise at constant Mach number, etc., but discrete 4D points do not convey that structure. This disclosure uses a structured, parametric approach based on straight (great circle) segments, constant-radius turn segments, and low-order polynomial approximation. In addition to data compression, polynomials also provide other desirable features, such as analytic differentiation and simplified interpolation.

A more fundamental problem with using a sequence of discrete 4D points is that AT location error couples into altitude. Assume, for example, that an aircraft is on approach for landing and is one minute ahead of schedule, but still within tolerance. If altitude is specified as a function of time, the aircraft will be required to land several miles before it reaches the runway! On the other hand, if altitude is a function of AT location, the aircraft will be required to land at the runway regardless of its status. Clearly the latter approach is preferable. Discrete 4D points are suitable for specifying aircraft trajectories that have already been flown, but this approach is the best choice for specifying trajectories, with error tolerances, yet to be flown.

A fifth requirement is that the format be in plain text, readable by humans. The traditional standard for text is ASCII (American Standard Code for Information Interchange), but the new more general standard is Unicode. For purposes of this disclosure, the ASCII subset of Unicode is sufficient. Text-based formats typically provide less efficient storage than binary formats, but a text-based format is often more flexible and less subject to error. Also, a text-based format is more convenient because it can be read directly by humans. Text can be compressed and encrypted into a binary format for efficient and secure radio transmission, but must be decompressed and decrypted at the receiving end to recover the original text. XML, the Extensible Markup Language, is a new standard text-based format for specifying structured data and transferring it across platforms. An XML data format standard can be used for specifying trajectories for appropriately equipped aircraft in future high-capacity airspace.

XML is designed for creating application-specific or domain-specific standards for data specification and transfer. The resulting text-based standards are intended to be independent of any particular computer platform or language. XML is rapidly replacing binary formats for automated business-to-business transactions and is being widely used for computing standards such as Scalable Vector Graphics (SVG). Whereas binary formats typically require the same data to be transferred in the same precise order every time, XML provides more flexibility in the selection and ordering of the data fields. The flexibility of XML will be indispensable for trajectory specification because each trajectory can have a variable number of segments of various types. The flexibility will also allow trajectories to be updated without repeating all the data that remains unchanged from the previous update, which could more than compensate for the inherent inefficiency of text-based data. Note also that XML text compresses well for efficient use of bandwidth.

The sixth requirement for the proposed trajectory specification standard is that it be suitable for an international standard that is recognized by, and can be automatically flown by, any standard flight management system (FMS). The standard will be used onboard aircraft to downlink requested trajectories constructed by the FMS or constructed by the pilot using a graphical user interface. The standard will also be used on the ground to check for conflicts and to uplink assigned trajectories. Developing a consensus for an international standard is obviously a major challenge, but such a common language can greatly simplify the logistics of high-capacity ATM. With a common trajectory language, the chances of miscommunication will be much less than they would be without one. If adopted, the actual communication mechanism would probably be an extension of CPDLC or a new data link message over the Aeronautical Telecommunication Network (ATN): Estimation of Flight Path Errors.

FIG. 1 illustrates a segment of an aircraft reference (error-free) flight path that is followed during a turn, at substantially constant altitude, by a turn angle $\phi$, showing AT error bounds, CT error bounds, and use of two integrated coordinates systems (Cartesian/polar/Cartesian) for a preceding linear segment LS1, a turn segment TS, and a succeeding linear segment LS2 for this portion of the reference flight path.

Figure 2:
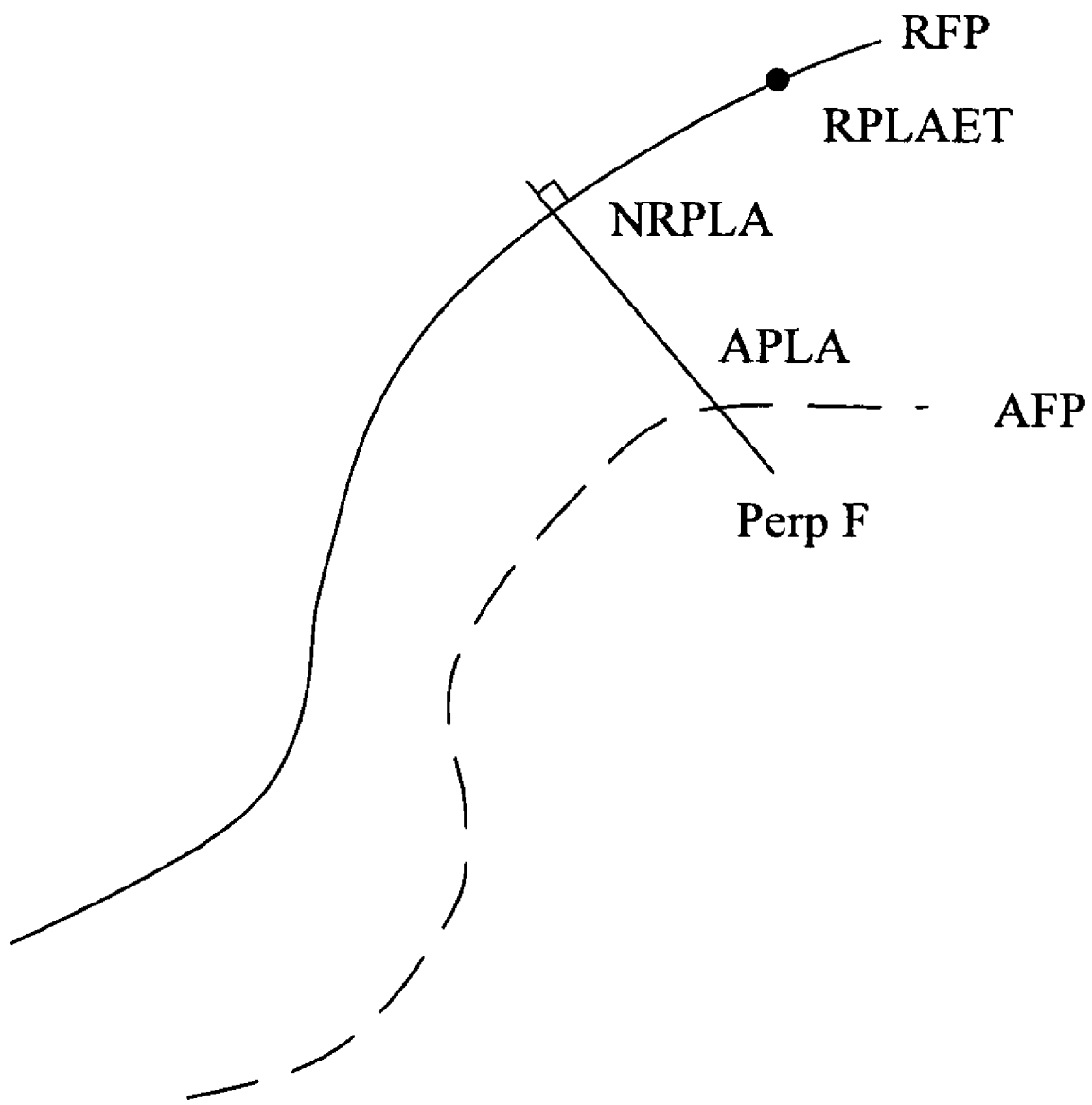
FIG. 2 illustrates a method for determining a location on a reference flight path corresponding to an aircraft present location.

A nearest-point reference present location NRPLA of the aircraft can be determined from the actual present location APLA, as illustrated in FIG. 2, which also illustrates the reference flight path RFP and the actual flight path AFP. A perpendicular segment PerpS, relative to the reference flight path RFP, is drawn or otherwise constructed from the APLA. An intersection of PerpS and RFP, referred to herein as a "perpendicular foot," of the APLA on the reference flight path RFP determines the NRPLA. The NRPLA is unique if the aircraft is in conformance or if certain conditions are met.

If the NRPLA is not unique so that M such corresponding locations exist (M≧2), one may use (1) the "earliest" location NRPLA that corresponds to the APLA, (2) the "latest" location NRPLA, or (3) a selected linear combination of all corresponding locations RPLA(m) (m=1, ..., M) that correspond to the APLA, as set forth in Eqs. (1-1), (1-2) and (1-3), respectively:

$$(x(NRPLA), y(NRPLA), z(NRPLA)) = (x(RPLA(m=1), y(RPLA(m=11), z(RPLA(m=1))), \quad (1-1)$$

$$(x(NRPLA), y(NRPLA), z(NRPLA)) = (x(NRPLA(n=N), y(NRPLA(n=N), z(NRPLA(n=N)) \quad (1-2)$$

$$(x(NRPLA), y(NRPLA), z(NRPLA)) M = \Sigma w_m (x(NRPLA(m), y(NRPLA(m), z(NRPLA(m))), \quad (1-3)$$

m=1 where $w_m$ is a non-negative weight value for the mth NRPLA location on the reference flight path RFP. Other prescriptions for determining the coordinates (x(NRPLA), y(NRPLA), z(NRPLA)) corresponding to the actual present location APLA. The distance $\delta$ of the NRPLA location along the flight path can be defined as an integral of differential arc length ds along the reference flight path RFP from an initial location to the NRPLA location:

$$\delta = \delta(NRPLA) = \int_{RFP(NRPLA)} ds. \quad (2)$$

Another quantity of interest here is a distance, denoted $\delta$(RPLAET) and measured along the RFP, from the initial location to an elapsed time aircraft location, where the aircraft would be at the present elapsed time t, if the aircraft had flown with zero error along the RFP:

$$\delta(RPLAET) = \int_{RFP(RPLAET)} ds. \quad (3)$$

The value, $\delta = \delta(NRPLA)$, is processed and used as a fourth coordinate in a description of the actual flight path.

With reference to FIG. 1, a CT error value $\delta_{CT}$ can be estimated by a distance d between the APLA and NRPLA locations:

$$\delta_{CT} = d\{APLA, NRPLA\} \quad (4)$$

An AT error value $\delta_{AT}$ can be estimated by an arc length difference between the locations NRPLA and RPLAET, measured along the RFP $$\delta_{AT} = |\delta(RPLAET) - \delta(NRPLA)|. \quad (5)$$

A z-difference, z(RPLAET)−z(APLA), can be interpreted as the altitude error:

$$\delta_{ALT} = |z(RPLAET) - z(APLA)| \quad (6)$$

The three error components, $\delta_{AT}$, $\delta_{CT}$, and $\delta_{ALT}$, are consistent with each other, and involve independent components. Because of the definitions of $\delta_{AT}^2$ and $\delta_{CT}$, the Euclidean distance d(APLA, RPLAET) between the actual aircraft location APLA and the elapsed time (error-free) location RPLAET will be close to, but may not have the same value as, the grid distance $$\{\delta_{AT}^2 + \delta_{CT}^2 + \delta_{ALT}^2\}^{1/2}.$$

The reference flight path RFP is a path the aircraft would follow in an ideal situation of zero technical error. Error tolerances, specified for each of the AT, CT and ALT axes, define a tube surrounding the RFP. So-called "straight" segments, associated with minimum distance between geodetic points are great circles but may be close to linear in latitude and longitude for short segments. In a straight (great circle) segment of a reference trajectory, the local flight path coordinate system is approximately Cartesian within the range of practical error tolerances, and the AT and CT coordinates of a point can be determined with established great circle algorithms.

The curve representing the reference flight path RFP is a continuous curve including primarily (1) one or more great circle (GC) segments and (2) one or more turn segments with substantially constant radius, both referenced to substantially level flight and (3) one or more substantially ascent or descent segments for change of aircraft flight level (FL). The arc length integral value for $\delta$ can be expressed as a sum of two components, the first being the accumulated arc length for the consecutive segments already completed. This component is straightforward to compute, because the consecutive components are continuous and are joined end-to-end, and each of these completed segments is fully characterized by the parameters describing the corresponding segment.

The second component is a not-yet-completed segment, the segment that is presently being followed. This segment is one of the types (1) or (2) or (3) characterized in the preceding paragraph, and the presently increasing arc length of this segment is determinable using the parameters that characterize this segment type. For a GC segment, the differential arc length increases according to $$ds_1 = R_A \Delta \phi, \quad (7)$$

where $\Delta \phi$, refers to the angle differential subtended at the Earth's center between the beginning of this (incomplete) segment and the present location of the aircraft (traveling along this GC segment) and $R_A$ is the constant radius of this GC segment. For a turn segment, the differential arc length increases according to $$ds_2 = R_T \Delta \eta, \quad (8)$$

where $\Delta \eta$ refers to the angle through which the aircraft has turned and $R_T$ is the constant radius of the turn. For an FL change segment, the differential arc length increases according to $$ds_3 = |\Delta h \csc \gamma|, \quad (9)$$

where $\gamma$ is the substantially constant angle, relative to a local horizontal plane, at which the aircraft is ascending or descending and $\Delta \gamma$ is the cumulative altitude increase or decrease, relative to the initial point of FL change for this segment. Coordinate Systems and Transformations.

An assigned trajectory consists of a 4D reference trajectory and flight technical error tolerances. The reference trajectory is the precise 4D trajectory the aircraft would fly in the ideal case of zero flight technical error. It is a collection of precise 3D locations that vary as a function of time, and the location at any point in time will be referred to as the reference location. The error tolerances, on the other hand, are the maximum allowed error in each of the three axes: AT, CT, and ALT. These tolerances define a 3D bounding space around a time-based sequence of reference locations, within which the aircraft must remain within to be in conformance.

A WGS84 geodetic coordinate system is preferably used as a global standard for specifying reference trajectories. Straight (i.e., minimum distance) segments between geodetic points are great circles in general, but for short segments (spaced apart from the earth's poles) a great circle is substantially linear in latitude and longitude. Geodetic coordinates are inconvenient for specifying and monitoring error tolerances, however. For that purpose, a curvilinear flight path coordinate system, which follows the reference trajectory, will be used. An example of a segment of such a curvilinear flight path coordinate system is illustrated in FIG. 1, showing the AT and CT grid.

A curvilinear flight path coordinate system is a combination of Cartesian and polar coordinate systems. The first step in converting from WGS84 coordinates to curvilinear coordinates is to determine the type of the local coordinate region, which is Cartesian in the (reference) straight segments and polar (or cylindrical in 3D) in the assigned turn segments as shown in the Figure. Actually, these regions are not strictly Cartesian or polar, because the regions follow the curvature of the earth; but for practical purposes they are Cartesian or polar within the local region of reasonable flight technical errors. The key point is that each segment defines its own local coordinate system, which is Cartesian for straight segments and polar for turn segments.

Note that the bounding space, BS in FIG. 1, is based on the definition of the AT and CT and ALT error coordinates. Thus, the bounding space follows the curvature of the flight path and may have curved, not planar, surfaces, as indicated in FIG. 1. An alternative way to define the error coordinates in terms of a time varying Cartesian coordinate system that follows the aircraft as it turns, but that would not work very well. With this alternative definition, the bounding space shown in FIG. 1, for example, would be a rectangular parallelepiped and would not conform to the curvature of the flight path. As the reference location progresses around the turn, the corresponding bounding space would be a rectangle that rotates with the reference track angle, which would clearly be inappropriate.

The AT and CT coordinates of two points are defined relative to a great circle or relative to a circular turn segment, connecting the points. Great circle equations apply only in the Cartesian-coordinate regions of the curvilinear flight path coordinate system, which correspond to the straight (great circle) segments of the assigned trajectory. However, these equations can easily be adapted for use in the polar coordinate regions also, which correspond to the turning segments of the assigned trajectory. One approach begins by computing the AT and CT coordinates as if a point were still in the preceding Cartesian region, then converts to polar coordinates. The origin of the polar coordinate system will be the center of the turn arc, and the reference azimuth angle is determined at the start of the turn. The actual CT coordinate will be the radial coordinate minus the nominal radius of the turn, so that the reference CT coordinate is always zero, consistent with the straight segments. The AT coordinate will be the angle relative to the start of the turn, multiplied by the nominal radius of the turn. Note that if the aircraft is flying the turn with a CT error, the actual radius of the turn will be different than the nominal radius, and the actual AT distance traveled by the aircraft will be different than the AT coordinate.

A 4D trajectory also includes a vertical profile, which is altitude as a function of time or AT location. While either time or AT location could be used as the independent variable AT location provides a critical advantage: it fixes the reference trajectory in the earth-fixed coordinate system, which simplifies conflict calculations. Using time as the independent variable, on the other hand, would allow the reference trajectory to drift (relative to the earth-fixed coordinate system) with the AT location error. As mentioned earlier, a trajectory can be visualized as a 3D tube in space, through which the aircraft flies, with the AT location in the tube being the fourth coordinate. The tube itself should be fixed in space. Making altitude a function of time causes the tube to shift in space as a function of the AT error.

Figure 3:
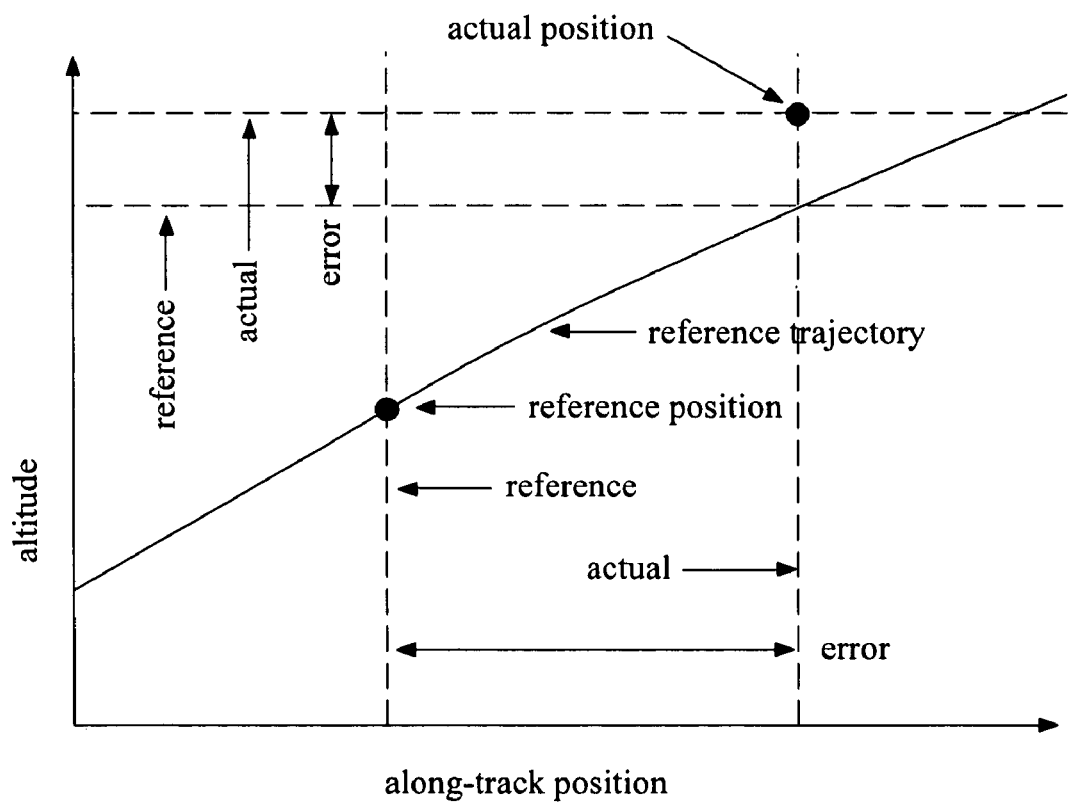
FIG. 3 illustrates determination of reference altitude and of actual altitude as a function of along-track (AT) location.

The AT location will be specified as a low order polynomial function of time for each segment, as will be discussed in the next section. Also, altitude will be specified as a low-order polynomial function of the actual (as opposed to reference) AT location, as illustrated in FIG. 3, which shows the reference trajectory as a solid curve with a dot on a curve. The other dot, in the upper right portion of the Figure, indicates the actual location of the aircraft. The AT location error is shown as a difference between the actual and reference locations. Similarly, the ALT error is shown as a difference between the actual and reference altitudes. The key point of FIG. 2 is that the reference ALT is a function of the actual, rather than reference, AT location. As noted in the preceding, this fixes the 3D flight tube in the earth-fixed coordinate system.

In case this distinction is still unclear or seems unnecessary, a simple thought experiment should help clarify and justify it. Consider a trajectory that is specified all the way through final approach to actual landing. Now suppose the flight is one minute behind schedule (but still within tolerance). If altitude is specified only as a function of time, then the aircraft will be required to touch down one minute—or several miles—before it reaches the runway! That obviously won't work. But if ALT is specified as a function of the scalar AT location, the flight will be required to touch down at the correct point on the runway regardless of how far ahead of or behind schedule the aircraft may be. Clearly, the latter approach is correct.

Polynomial Approximation

In the current air traffic system, ALT profiles are difficult to predict accurately based on information available on the ground. Part of the problem is that weight and thrust (or throttle setting) are not accurately known on the ground. Another major source of altitude prediction uncertainty is the lack of knowledge of the actual time of initiation of an altitude transition. When an ascend or descend command is received, the time taken by the pilot to initiate the maneuver can vary by up to about a minute. As a result, controllers must reserve a large block of airspace around any aircraft that is in, or is about to enter, an altitude transition. With better information available on the ground, altitude can be assigned more precisely, which will increase airspace capacity.

An ALT profile is specified to provide reasonable bounds on altitude without significantly compromising efficiency. In the absence of conflicts, the ALT profile approximates a profile that the aircraft would be most likely to fly, if unconstrained (or with) normal arrival time constraints. In ascent and descent, commercial transport airplanes normally fly with the throttle fixed and with feedback to the elevator to maintain constant CAS (at lower altitudes) or constant Mach number (at higher altitudes). In the future, the intended CAS/Mach schedule will be known on the ground, as will the throttle setting and the estimated weight of the aircraft. The predicted wind, temperature, and pressure fields will also be available from a centralized weather service. Given this data, the ALT profile can usually be predicted fairly accurately, and an approximation of the predicted ALT profile can be used as the assigned ALT profile. If the wind data are reasonably accurate, and if the ALT tolerances are reasonable, the aircraft should be able to conform to the specified trajectory by flying as usual with the specified power and CAS/Mach schedule.

The mechanics of the procedure will be similar to what is currently done in the Center/TRACON Automation System (CTAS), but with a few key differences. CTAS is a suite of ATC/ATM decision support tools that is being developed at NASA Ames Researcl Center. CTAS currently has to guess at the weight and the CAS/Mach schedule to be flown, but these data will be available from the aircraft or from the AOC. A more fundamental difference is that the predicted trajectory will actually become the assigned trajectory if the trajectory is free of conflicts; otherwise, the trajectory will be modified to eliminate any conflicts before becoming the assigned trajectory. The current ATC system has no such precisely defined ALT profiles, and use of a CTAS prediction does not guarantee actual, or even attempted, conformance. In fact, the notion of vertical conformance itself isn't even defined for an altitude transition.

The CTAS software process that predicts trajectories is referred to as a Trajectory Synthesizer (TS). The TS contains performance models of all major aircraft types, and types that are not modeled directly are approximated with similar available models. The inputs to the TS for each aircraft include the aircraft type and weight, CAS/Mach values, throttle settings, the flight plan, and the current weather data file from the Rapid Update Cycle (RUC). The output is the predicted 4D trajectory in the form of a discrete series of coordinates in which the time increment varies with the dynamic state. The TS or its functional equivalent can be used to construct the reference trajectory as closely as possible to the trajectory that would have been flown without the constraints.

Figure 4:
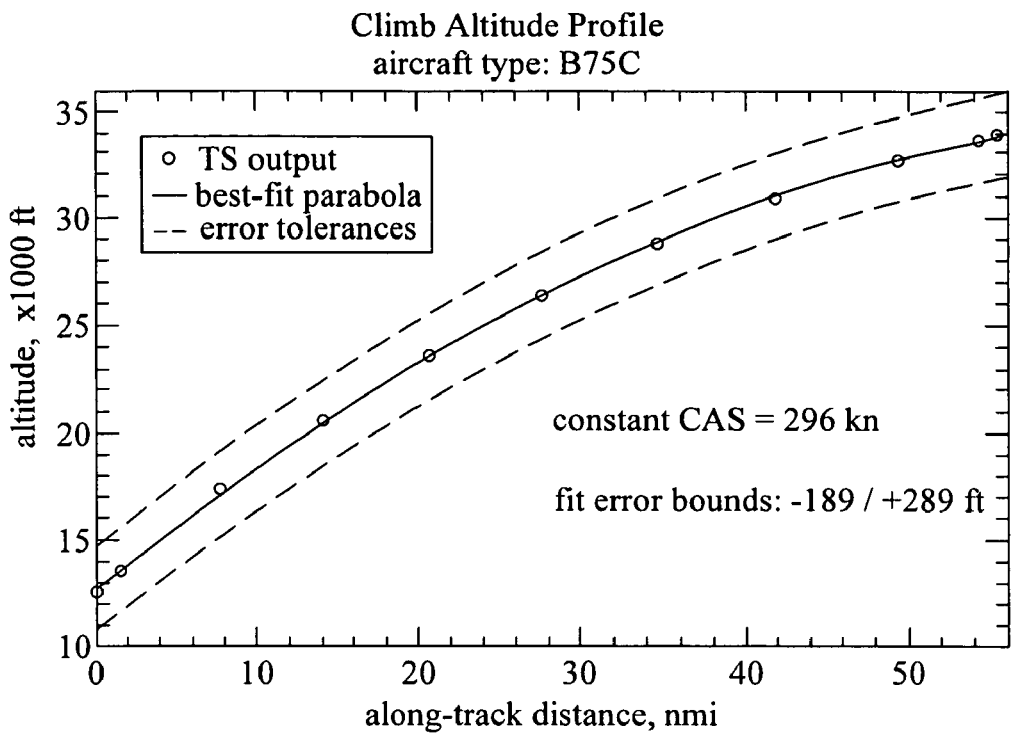
FIGS. 4 and 5 graphically illustrate synthesized altitude profile and a best-fit parabola and error bounds for a constant calculated air speed (CAS) for an ascending aircraft (Boeing 757)

FIG. 4 shows the ALT profile synthesized by the TS for a constant-CAS climb segment of a Boeing 757 from an altitude of about 12,000 ft, where it exits the TRACON, to 34,000 ft, in a randomly selected wind field. The solid line represents the best-fit parabola, and the dashed lines represent an example error tolerance of ±2000 ft relative to the parabola. The constant-CAS segment is followed by a short constant-Mach segment (not shown), which would require its own curve fit. In most cases, the aircraft should be able to fly the specified CAS of 296 knots without altitude feedback or throttle modulation, and stay within the specified altitude range. Only if the TS is substantially in error would the aircraft need to use feedback of altitude, and perhaps also throttle modulation, to stay within tolerance. Such error could be due to errors in wind, thrust, and/or weight. Altitude feedback, and perhaps throttle modulation, could be activated when the altitude deviation from the reference reaches a threshold value of, say, 1000 ft. Alternatively, an FMS could be programmed to use a more refined criterion.

The curve fit error bounds of the parabola in FIG. 4 are −189 ft and +289 ft, for a total range of 478 ft; this curve could be offset to make the error bounds symmetric, if desired but that is not done here). With an ALT error tolerance of ±2000 ft. that fit allows a worst-case altitude deviation, relative to the TS output, of 189−2000=−1811 to 2000−289=+171 ft, which is probably sufficient. However, if the error tolerance were tighter, say ±1000 ft, that quadratic fit would only leave a worst-case altitude deviation of −811 ft to +711 ft, which might not be considered sufficient. In that case, the segment could be divided into two or more segments, or a cubic or quartic polynomial could be used for a better fit. For this example, a cubic polynomial gives fit error bounds of −178 to +94 ft (27' ft range), and a quartic gives −102 to +68 ft (170 ft range). Polynomials of fifth order or higher may have numerical problems and should be avoided, but polynomials of fourth order or less should not suffer from significant numerical round-off errors if a consistent numerical precision of 64 bits is used in both ground-based and airborne computers. When engine problems prevent climbing at a normal rate, the aircraft should notify the ground immediately of the expected non-conformance, and the ground will then reroute any affected aircraft. When routing under climbing aircraft, precautions could be taken to minimize the chance of a conflict due to engine non-performance. For example, trajectories could be determined for all levels of engine power from full power down to one engine out and those trajectories could be avoided. The lower altitude tolerance, which will be discussed later, could be used for this purpose.

Figure 5:
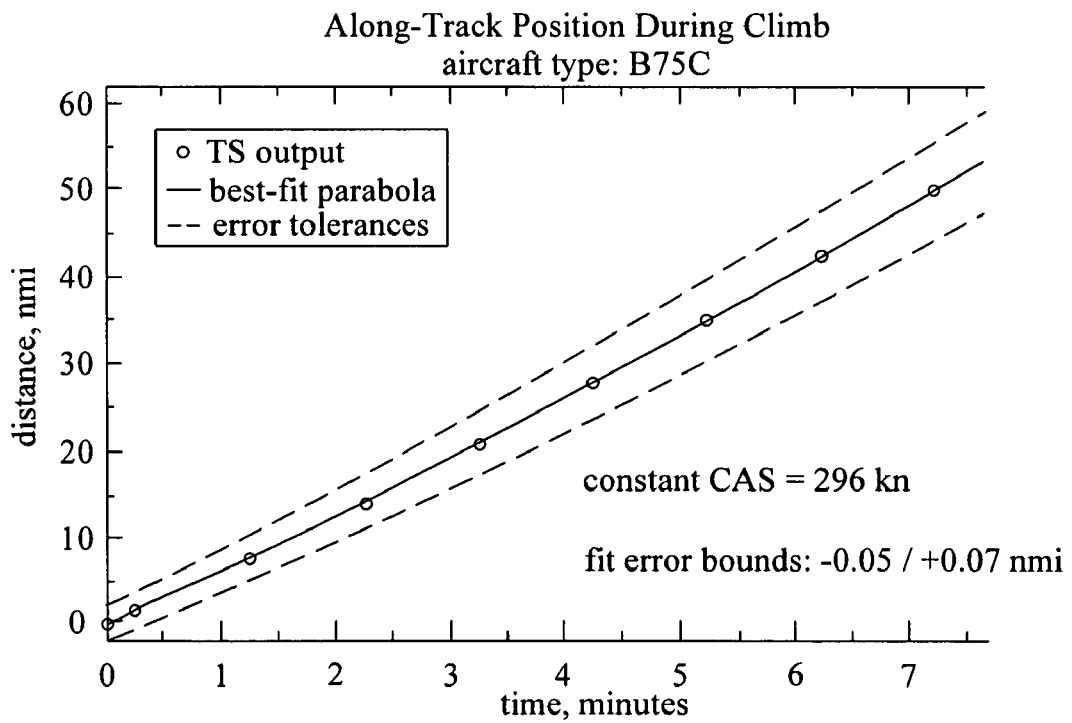

FIG. 5 shows the AT location associated with the climb of FIG. 4. The best-fit parabola fits with error bounds of −0.05 to +0.07 nmi, which is close enough for all practice purposes. The example error tolerances represented by the dashed lines start out at ±2 nmi and grow linearly with time at a rate of 0.5 nmi/min to ±6 nmi at 8 min from the start of the climb.

Figure 6:
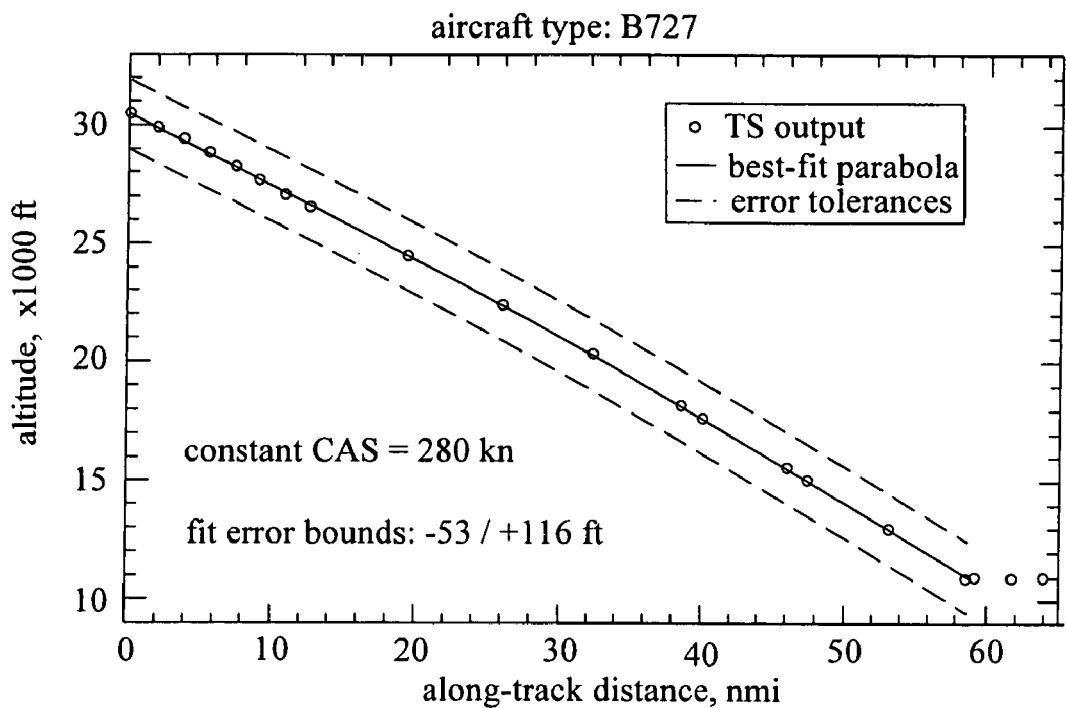
FIG. 6 graphically illustrates synthesized altitude profile and a best-fit parabola and error bounds for a constant calculated air speed (CAS) for descending aircraft (Boeing 727).

FIG. 6 shows the ALT profile synthesized by the TS for a constant-CAS, idle-thrust descent segment of a Boeing 727 from an altitude of about 30,000 ft to 11,000 ft, where it enters the TRACON, in a randomly selected wind field. Again, the solid line represents the best-fit parabola, and the dashed lines represent a hypothetical error tolerance of ±1500 ft. The constant CAS-segment is preceded by a short constant-Mach segment (not shown), which would require its own curve fit. Again, the aircraft should normally be able to fly the constant CAS of 280 knots without altitude feedback or throttle modulation and stay within the specified altitude range. As before, altitude feedback, and perhaps throttle modulation, could be activated when the altitude deviation reaches some threshold value. With error bounds of −53 ft to +116 ft, the curve fit for this descent is much more accurate than for the climb of FIG. 4. Descents tend to be more nearly linear than long climbs, and are usually well modeled with a parabola. In general, an arrival descent would be followed by a short level cruise segment into the meter fix, which would allow the aircraft to cross the meter fix at a precise level altitude.

Figure 7:
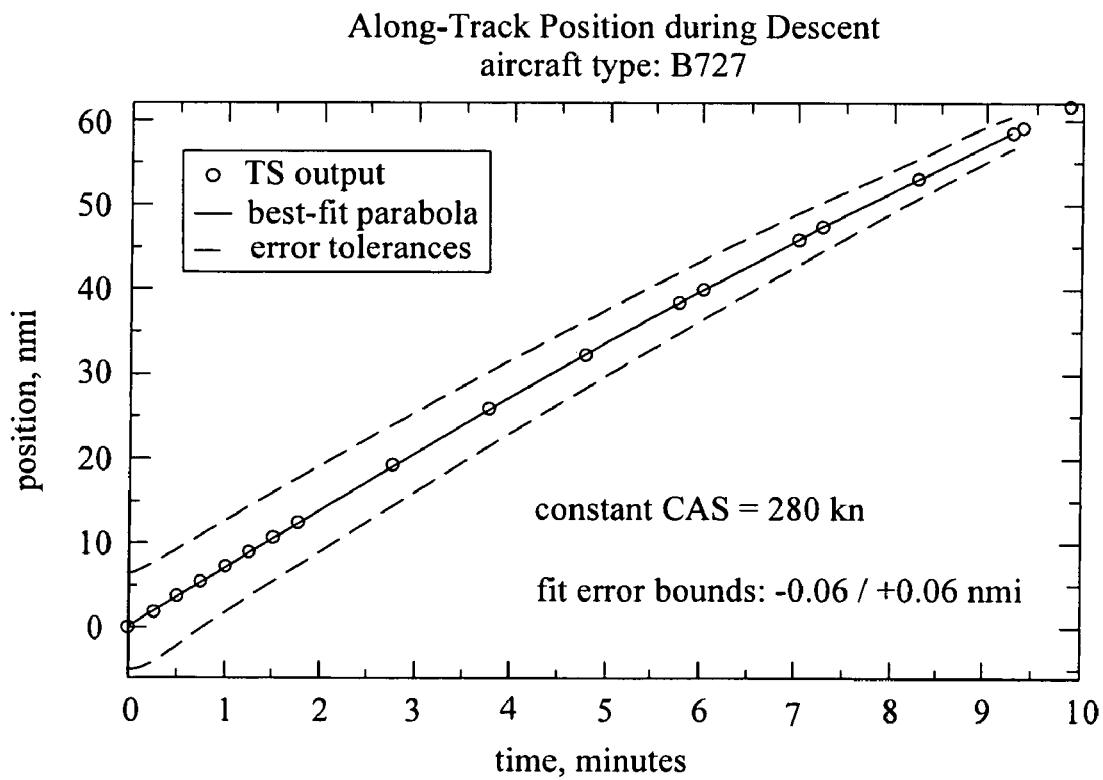
FIG. 7 graphically illustrates synthesized altitude profile and a best-fit parabola and error bounds for a constant calculated air speed (CAS) for an ascending aircraft (Boeing 727)

FIG. 7 shows the AT location associated with the descent of FIG. 6. The best-fit parabola fits with error bounds of −0.06 to +0.06 nmi, which is close enough for all practical purposes. The example error tolerances represented by the dashed lines start out a 6 nmi and are reduced in magnitude linearly with time at a rate of 0.5 nmi/min to slightly less than ±2 nmi at 9 min from the start of descent. Climbing aircraft usually only need to control airspeed using the elevator (with throttle fixed). However, descending aircraft neec to control both altitude and precise time of arrival at the meter fix, so that such aircraft need tighter control using not only the elevator but possibly also the throttle or speed brake.

A wind vector is added to the airspeed "vector" (based on airspeed and heading relative to the wind) to determine the varying groundspeed of the aircraft as it progresses through a turn. The law of cosines is then used to compute the resulting groundspeed, which can be numerically integrated to precisely determine the AT location as a function on time. In any nonzero wind field the groundspeed will vary through the turn, and the bank angle must be varied accordingly to maintain a coordinated turn (in which gravity and centrifugal acceleration add vectorially to a force normal to the floor of the aircraft). The necessary bank angle β is given in terms of the varying groundspeed, v, by $$\beta = \tan^{-1}(v^2/(R_T g)), \qquad (9)$$

where $R_T$ is the (constant) turn radius, and g is gravitational acceleration. The radius of the turn can be selected so that the maximum bank angle through the turn does not exceed a specified magnitude.

Figure 8:
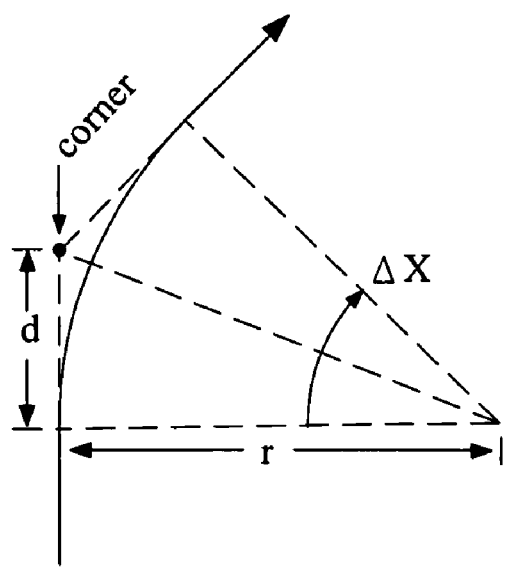
FIG. 8 graphically illustrates an aircraft turn geometry.

The turn angle between adjacent straight (great circle) segments can be determined using the "course" function given in the Appendix for determining the initial course angle of a great circle segment (the spherical Earth equations are plenty accurate for this purpose The turn angle between great circles (A,B) and (B,C) is "course(B,C)−course(B,A)±180 deg." Each turn segment should be tangent to the two great circle segments that it connects The turn corner is at the intersection of the two great circle segments, and a turn of angle Δ must begin at a distance $d = r \tan(\Delta\chi)$ before the corner, as shown in the FIG. 8 turn geometry.

Figure 9:
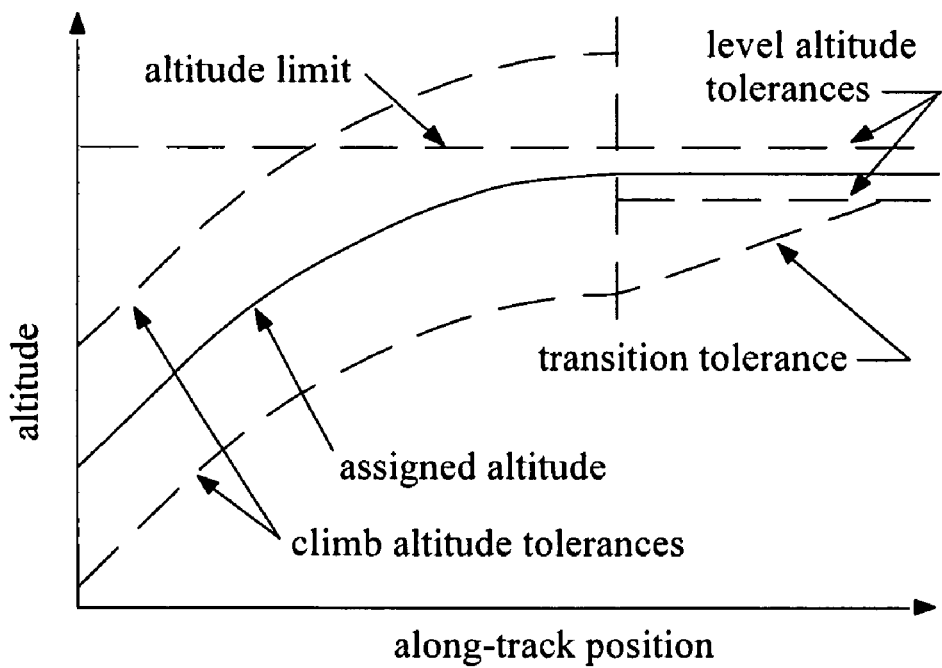
FIG. 9 graphically illustrates error bounds for an aircraft that is transitioning from ascending to level flight.

A problem with transitioning from a non-level segment to a level segment is that the altitude tolerance will virtually always be discontinuous. A typical altitude tolerance for level flight might be ±200 ft. but for climb or descent the tolerance could be ten times larger. Going from a level segment to a non-level segment is not a problem because the tolerance increases, but going from a non-level segment to a level segment is a problem because the altitude tolerances decrease sharply and discontinuously, as illustrated in FIG. 9. The linearly decreasing "transition tolerance" shown for the lower altitude tolerance is one possible approach for reducing the tolerance less abruptly. The AT distance over which the tolerance decreases, which could be something like 5 to 10 nmi, will be specified as part of the segment characteristics for the level segment.

FIG. 9 also illustrates another problem with transitioning from a non-level segment to a level segment. The upper altitude tolerance during the climb segment allows the aircraft to go significantly above its intended cruising altitude, exposing it to potential conflicts with traffic at the next higher flight level. To prevent such exposure, an "altitude limit" can be specified in the "max" attribute of the "ALT" sub-element of "segment." This maximum altitude limit overrides the upper altitude tolerance, as shown in the figure. For a descent segment, the "max" attribute would be replaced by "min." This maximum altitude limits any "overshooting" of target altitude and will normally be the upper altitude tolerance for the level segment. The same geometry turned upside down applies to descent.

The three axes in which the error tolerances are specified are AT, CT and ALT (vertical). In terms of energy, the least expensive axis in which to maintain conformance is the cross-track axis. If the aircraft can fly the assigned ground track to within the CT tolerance, the marginal energy required to do so is usually small. In the case of unexpected crosswinds, the aircraft only has to "crab" to stay on track, and the main controls required are the ailerons and the rudder.

In a cruise mode, vertical conformance is also inexpensive, but AT conformance can be far more expensive, depending on how accurately the AT winds can be modeled and predicted. Aircraft normally cruise at constant airspeed (CAS or Mach), and the groundspeed corresponding to the most efficient airspeed obviously varies with the AT wind speed. If the wind field prediction is accurate, then an efficient groundspeed can be determined and assigned. If the predicted winds are substantially in error, however, the airspeed corresponding to the assigned groundspeed could be inefficient or even realistic. The two relevant concerns here are the wind prediction accuracy and the speed range of the aircraft.

R. E. Cole, Green, Jardin and Schwartz ("Wing Prediction Accuracy for Air Traffic Management Decision Support Tools, Third USA/Europe Air Traffic Management R&D Seminar, Napoli, Italy, 13-16 Jun. 2000) cite wind prediction accuracy results for the Rapid Update Cycle (RUC-1) augmented with aircraft wind reports. The wind error vector magnitude was 7.85 mls (15.3 knots) or less 90 percent of the time, and error vector magnitude exceeded 10 mls (19.4 knots) only 4 percent of the time. The errors tend to be somewhat worse during the winter months because of higher wind speeds in general, but they are somewhat better than the quoted figures the rest of the year. The errors also tend to be larger at higher altitudes where the wind speeds are higher, but the figures quoted above are from actual aircraft at their operating altitudes. These performance figures can perhaps be expected to improve over the next twenty years. Note also that the AT component of the wind error, which is the significant quantity here, is less than the vector magnitude. Averaged over all heading directions, the mean headwind error is 2/,rr(';  : : , 0.64) times the magnitude of the error vector (that probably overstates the average effective reduction, however, because neither heading directions nor wind error vectors are uniformly distributed).

Figure 10:
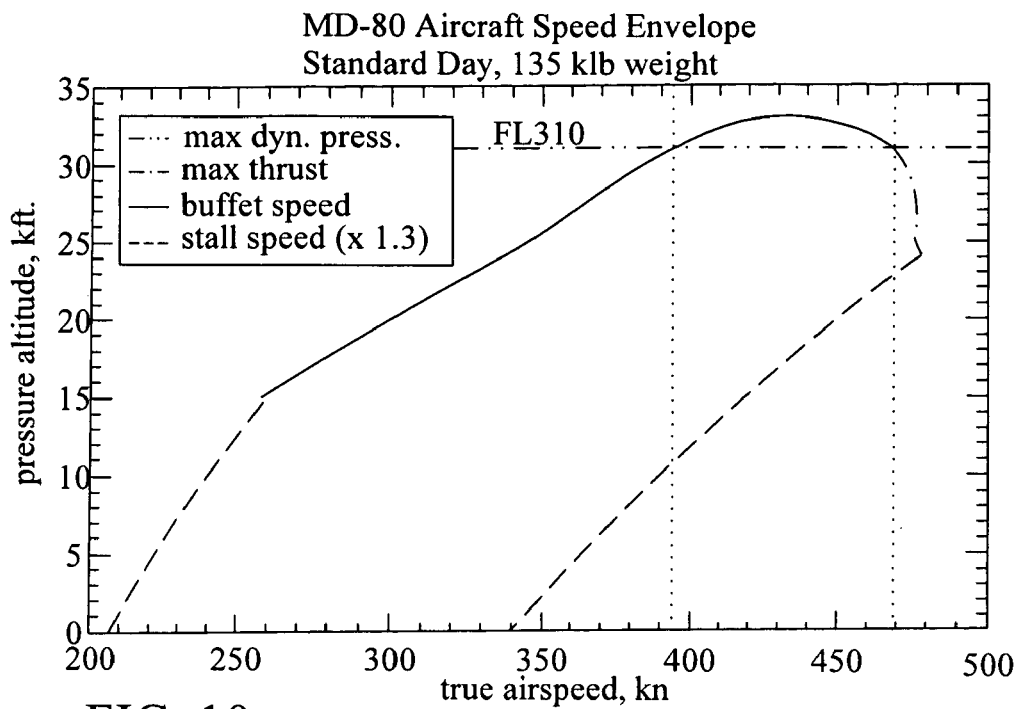
FIG. 10 graphically illustrates an aircraft air speed envelope versus pressure altitude for an MD-80 aircraft.

The other relevant factor here is aircraft speed range. FIG. 10 is a graph of the speed envelope for an MD-80 aircraft at a gross weight of 135,000 lb on a standard day. This Figure is based on data that came from a McDonnell Douglas performance handbook. These data, as well as the aircraft weight, would be known by the ground systems for all equipped aircraft. Any uncertainties in the weight would need to be accounted for to guarantee that the speed range is not overestimated.

FIG. 10 indicates that the speed range decreases sharply as the pressure altitude ceiling of approximately FL330 (for this weight) is approached. At FL310 the speed range is approximately 75 knots, and at FL290 it is slightly below 100 knots. Assume that the aircraft is flying at FL310 at the recommended cruise speed of Mach 0.76, which is equivalent to 446 knots at that altitude. The speed envelope then goes from approximately 394 to 469 knots, as shown in FIG. 10, so the speed can be increased by a maximum of 23 knots or decreased by a maximum of 52 knots from the recommended speed. Thus, if the wind prediction error is within the range of −23 to +52 knots, the aircraft can maintain the assigned groundspeed exactly.

Although the aircraft can fly from 394 to 469 knots at FL310, it cannot fly efficiently over that entire range, of course. Suppose the efficiency is deemed "acceptable" from 430 to 454 knots at that altitude and weight. Then, as long as the wind prediction error is within −8 to +16 knots, the aircraft can maintain the assigned groundspeed exactly and still fly with acceptable efficiency. Outside that range, an incentive exists to fly at 500 an efficient airspeed until a point is reached at which the aircraft can no longer conform to the AT error tolerances. Hence, additional rules may need to be established for how tightly an aircraft should track the assigned groundspeed, but such rules will not be discussed in this disclosure.

The aircraft isn't required to fly the assigned groundspeed exactly; it is only required to stay within the AT location bounds, which can vary linearly with time. Suppose the AT tolerance rates are zero, the AT location tolerances are ±2 nmi, and the aircraft is centered within the AT location bounds. If the AT wind error is within ±10 knots, the aircraft will be able to maintain its recommended airspeed for at least 12 min, worst case, before it can possibly fall out of conformance.

Alternatively, if the along-track tolerance rates are ±12 knots, then the AT tolerances will increase at that rate, which is 0.2 nmi per minute, in each direction. Thus, the aircraft will be able to fly at the recommended airspeed and maintain a constant or increasing margin from the AT bounds even if the AT wind predictions are in error by up to ±12 knots.

Commercial transport airplanes normally climb with throttle fixed somewhere in the range of 85 to 95 percent of full throttle, with feedback to the elevator to maintain constant CAS (at lower altitudes) or constant Mach (at higher altitudes). If the errors in the prediction of the AT wind speed are reasonably small, the aircraft should still be able to fly in that mode. However, when ALT or AT location approach their bounds, the throttle may also need to be adjusted to maintain conformance. The feedback to the throttle could be programmed to start automatically when the deviation reaches some threshold magnitude. The error tolerances should be set to accommodate the entire range of potential wind errors to some high level of certainty, say 99.9 percent. This could make the error tolerances fairly large, but at least they will clearly bound the area (as a function of time) that needs to be avoided by other aircraft. In the current system, the lack of explicit bounds forces controllers to effectively block out excessively large amounts of airspace for climbing and descending aircraft, which reduces airspace capacity.

In the event of substantial errors in the prediction of AT winds, aircraft could be forced to fly at grossly inefficient speeds to maintain AT location conformance. Worse yet, they could reach a state in which they are aerodynamically incapable of flying at the speed necessary to maintain conformance. To avoid either of those two undesirable conditions, particularly the latter, the AT assignments will be updated periodically. The updates could apply to position, speed, and error tolerances. With proper updates, the worst that should happen is that some traffic may be forced to fly inefficiently for short periods of time to avoid a conflict, but they would obviously never be required to fly at speeds of which they are incapable of flying.

A complete 4D trajectory can (optionally) be filed by each participating aircraft or its AGC prior to takeoff. The trajectory reference time can be defined relative to a time at which the aircraft is expected to cross some predefined marker, such as the end of the takeoff runway. Because takeoff time usually cannot be predicted exactly, the first AT update will occur immediately after takeoff. When the aircraft crosses the reference marker, its reference time will be adjusted accordingly. Because all other times are relative to the reference time, no other times need to be changed. By adjusting the trajectory reference time, the entire trajectory can be effectively shifted in time.

After takeoff, the FMS will guide the aircraft along its assigned climb trajectory. As explained earlier, conventional feedback of speed error to the elevator will be used to maintain constant CAS or Mach, and feedback to the throttle will be used only if the vertical or AT deviation reaches some threshold value, which shouldn't happen often if the wind predictions are reasonably accurate and the error tolerances are reasonable. If the aircraft does drift away from its reference trajectory and approach its AT error bounds, however, the ground can update the AT assignment by changing the assigned position, speed, and/or error tolerances. Such updates would be done only if they do not cause a conflict within the conflict time horizon of, say, 15 min.

The most common type of AT assignment update will be to change the assigned position to the current position and to simultaneously reset the position error tolerances to their initial values. The assigned groundspeed (the rate of change of the assigned AT location) could also be changed if the wind model is determined to be significantly in error. This kind of update could be done periodically at a rate of, say, once per two minutes, except that it would not be done if it produces a potential conflict within the conflict time horizon. A potential conflict is defined as having the bounding spaces of two aircraft come closer together than the required minimum separation. In other words, conformance to their assigned trajectories by any two aircraft must guarantee the minimum required separation.

Because all the times given in the trajectory specification are relative to the trajectory reference time, the entire trajectory can be shifted in time by changing the reference time. That is equivalent to changing the assigned AT location. As a flight progresses, trajectory segments that are completely in the past can be discarded. Because AT updates will be a common operation, an abridged format is appropriate, where unchanged data is not repeated.

Trajectory Visualization.

As for the unique onboard requirements, the main one is that the aircraft be capable of conforming to its assigned trajectory. This will most likely be an automated function of an advanced FMS. Another onboard requirement is to display the reference trajectory for the pilot, which could be done with an advanced CDTI (Cockpit Display of Traffic Information), perhaps as a head-up display. A CDTI could also conceivably be used for real-time guidance, instead of an FMS, to allow aircraft not equipped with an FMS to fly in high-density airspace for short periods of time for arrival at busy airports. This possibility will be discussed briefly in the next section.

Trajectory Display

In twenty years, virtually all commercial transport aircraft are likely to be equipped with an advanced FMS capable of automatically flying a specified trajectory. Pilots will still need to be able to visualize their assigned trajectory and monitor conformance, however, New. CNS technologies should be able to provide that capability at a reasonable cost. A technology called Cockpit Display of Traffic Information (CDTI) uses GPS/WAAS and ADS-B to provide an onboard visual representation of the local traffic environment. An advanced CDTI could also show assigned trajectories for improved situational awareness.

Such an advanced CDTI could also conceivably be used in place of an FMS for pilot guidance. Whereas an FMS must be developed for a particular aircraft model, generic CDTI units can be produced for any aircraft with a compatible slot in the cockpit, and are potentially cheaper to test and certify, hence a CDTI unit could potentially be cheaper than an FMS. This fact could allow lower-cost aircraft, perhaps even general aviation, to participate for short periods of time as equipped aircraft in high-density airspace, which could be critical in crowded terminal and transition airspace. The trajectory error tolerances for such aircraft would probably need to be larger than for aircraft equipped with an FMS, but they would still fly much more precise and predictable trajectories than aircraft not equipped with CDTI guidance.

Figure 11:
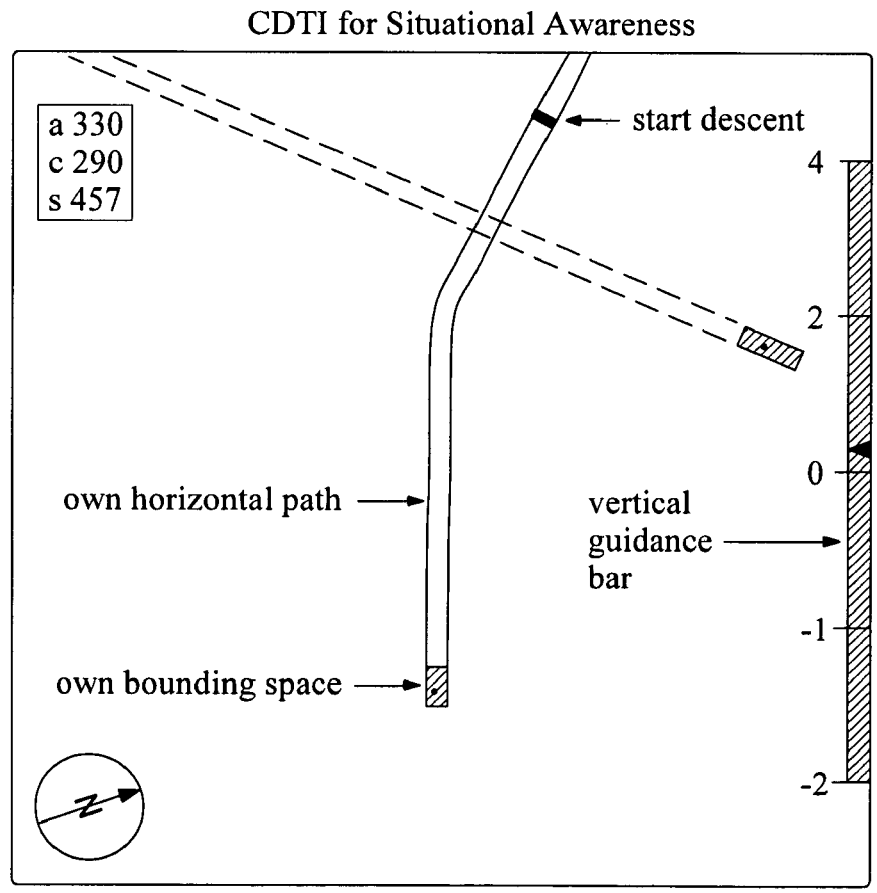
FIGS. 11, 12 and 13 graphically illustrate cockpit displays of traffic information (CDTIs) for horizontal and vertical guidance and for situational awareness for a representative aircraft flight.

FIG. 11 shows how an advanced CDTI might be used for situational awareness. It shows the local traffic as any CDTI would, but it also shows the bounding space and the future assigned horizontal path of the user and the local traffic, so surprise maneuvers are minimized. The start of descent point is also indicated, and a vertical guidance bar appears on the right edge of the display so that all three axes are represented in one view. The small box in the upper-left corner shows current altitude, course, and speed, and a compass pointer appears in the lower-left corner.

Figure 12:
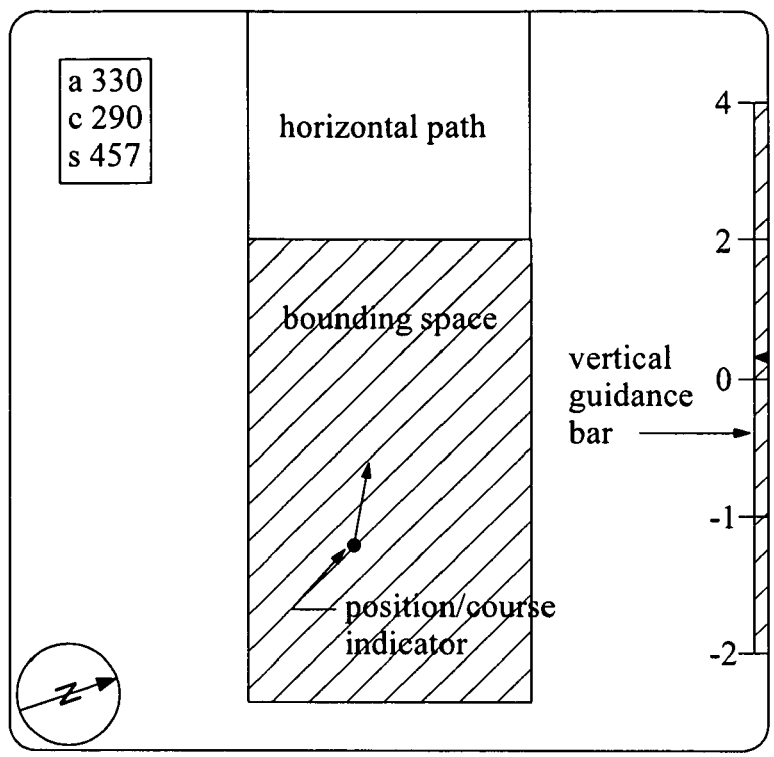
Figure 13:
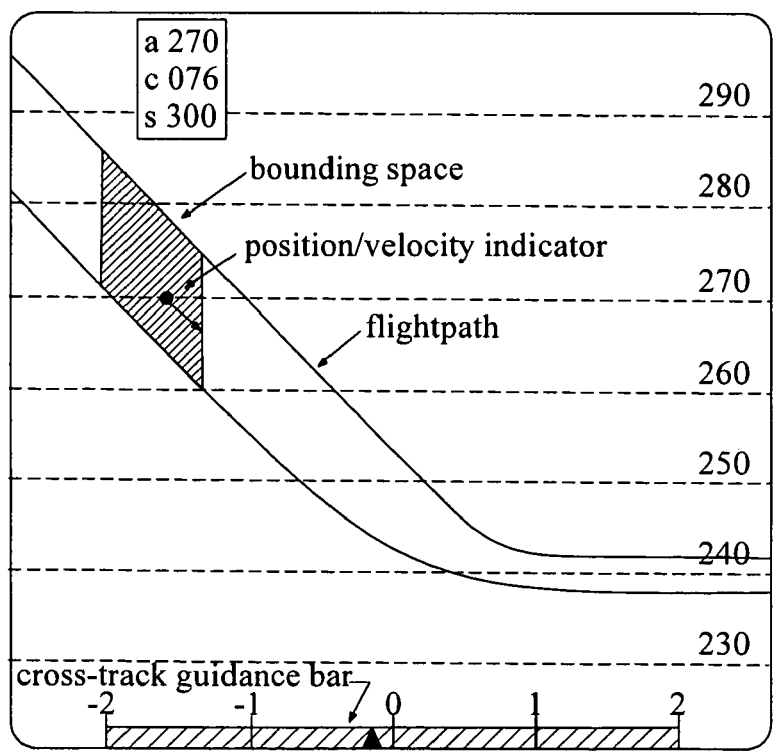

FIG. 12 shows how the same CDTI could be zoomed in for finer guidance, again perhaps as a head-up display. The horizontal position of the user within the bounding space is clearly shown, as is the velocity relative to the reference velocity. Again, a vertical guidance bar appears on the right edge of the display, but more detailed vertical guidance could also be provided during climb and descent, as shown in FIG. 13. The vertical guidance display includes a CT guidance bar so that some guidance is always provided in all three axes.

Each AOC or pilot will be allowed to submit requests at any time for specific trajectories or trajectory revisions. Requested trajectories and revisions will be checked on the ground for conflicts within the conflict time horizon, and if they are free of conflicts and consistent with the longer range traffic flow plan, they will be approved. Otherwise, the requested trajectory will be minimally revised on the ground to resolve the conflict or other problem, then it will be uplinked as the assigned trajectory. Message digests such as MD5 or SHA-1 can be used to guarantee datalink integrity.

Trajectories are broken down into a series of trajectory segments of various types. With three vertical types (climb, level, and descent), three heading types (straight, right turn, and left turn), and five speed types, the total number of possible combinations is 45. The horizontal path consists of a series of geodetic waypoints connected by great circles, and the great-circle segments are connected by turns of specified radius. Along-track location is specified as a low-order polynomial function of time, and vertical profiles for climb and descent are specified as low-order polynomial functions of actual (not reference) AT location. Flight technical error tolerances in the AT, CT and ALT axes determine the bounding space. Periodic updates in the along-track axis adjust for errors in the predicted AT winds.

Use of this regimen of assigned 4D trajectories can eliminate the need for separation monitoring (of equipped aircraft by human air traffic controllers. It can also guarantee that the equipped traffic will be able to fly free of conflicts for at least several minutes even if all ground systems and the entire communication infrastructure fail. This failsafe guarantee, along with the elimination of the human factor from the primary separation feedback loop, has the potential to greatly increase airspace capacity. That increase in capacity will be necessary within the next two decades if the U.S. air traffic system is to keep pace with the growing demand for air travel.

The invention claimed is:

1. A system for analyzing and presenting information on an aircraft flight path, the system comprising a computer that is programmed:

to provide a description of aircraft location along an actual flight path in terms of Cartesian coordinates (x, y, z), referenced to a selected coordinate system, and in terms of an estimated distance δ moved by the aircraft along a reference flight path during an elapsed time interval corresponding to the present time;

to estimate coordinates ($x_p$, $y_p$, $z_p$) for present location for the aircraft;

to estimate location of a perpendicular foot, having location coordinates ($x_{foot}$, $y_{foot}$, $z_{foot}$) of the aircraft on a curve C representing the reference flight path;

to interpret the perpendicular foot location as a nearest reference flight path location corresponding to the present location of the aircraft;

to estimate an arc length along the curve C from an initial reference location to the nearest flight path location;

to interpret the arc length as the estimated distance δ;

to estimate, at each of a sequence of values of the estimated distance δ, an error value, including at least one of an along-track ("AT") error, a cross-track ("CT") error and an altitude ("ALT") error for the aircraft relative to the reference flight path;

to provide, for at least one of the sequence of values of δ, a permitted error range for at least one of the AT error, the CT error and the ALT error, wherein the AT error, the CT error and the ALT error define a bounding space that maintains a minimum required separation distance; and to present at least one of a visually perceptible display, an audibly perceptible display and an alphanumeric display of at least one of the AT error, the CT error and the ALT error as an error value for at least two of the sequence of values of δ.

2. The system of claim 1, wherein said computer is further programmed:

to advise an operator of said aircraft of a magnitude of said error value; and to recommend an action to be taken by said aircraft to correct or reduce the magnitude of said error value, when said error value lies outside a corresponding permitted error range.

3. The system of claim 1, wherein each of M locations (M≧2), numbered m=1, . . . , M, on said curve C qualifies as said perpendicular foot for said aircraft location on said curve C with a corresponding estimated distance δ(foot;m), and said computer is further programmed to estimate a designated perpendicular foot, for purposes of estimating said arc length along said curve C, by a process comprising:

(1) estimating said distance $\delta(foot;m)$ $(m=1,\ldots,M)$ for the perpendicular foot on said curve C for the location number m; and (2) the designated perpendicular foot is determined for a location number $m=m1$ $(1 \leq m1 \leq M)$ for which $\delta(foot;m1)$ is no greater than any of the distances $\delta(foot;m)$ $(m=1,\ldots,M)$.

4. The system of claim 1, wherein said computer is further programmed:

to estimate a second distance $\delta(PLAET)$ that said aircraft would have flown along said reference flight path in said elapsed time interval; and to estimate said AT error as a distance $\delta(AT)=|\delta-\delta(PLAET)|$.

5. The system of claim 1, wherein said computer is further programmed:

to estimate a second distance $\delta(PLAET)$, having location coordinates $(x_{PLAET}, y_{PLAET}, z_{PLAET})$, that said aircraft would have flown along said reference flight path in said elapsed time interval; and to estimate said CT error as a distance $\delta(CT)=d1\|(x_p,y_p)-(x_{PLAET},y_{PLAET})\|$, where $d1\|\ \|$ is a selected distance metric for two locations in a plane having location coordinates $(x_p,y_p)$ and $(x_{PLAET},y_{PLAET})$.

6. The system of claim 1, wherein said computer is further programmed:

to estimate a second distance $\delta(PLAET)$, calculated from location coordinates $(x_{PLAET}, y_{PLAET}, z_{PLAET})$, that said aircraft would have flown along said reference flight path in said elapsed time interval; and to estimate said ALT error as a distance $\delta(ALT)=|(z_p),(z_{PLAET})|$.

7. The system of claim 1, wherein said computer is further programmed:

to estimate a second distance $\delta(PLAET)$, having location coordinates $(x_{PLAET}, y_{PLAET}, z_{PLAET})$, that said aircraft would have flown along said reference flight path in said elapsed time interval;

to estimate said AT error as a distance $\delta(AT)=|\delta-\delta(PLAET)|$;

to estimate said CT error as a distance $\delta(CT)\ d1\|(x_p,y_p)-(x_{PLAET},y_{PLAET})\|$, where $d1\|\ \|$ is a selected distance metric for two locations in a plane having location coordinates $(x_p,y_p)$ and $(x_{PLAET},y_{PLAET})$; and to estimate a horizontal error as a distance $$\delta(horiz)=\{\delta(AT)^2+\delta(CT)^2\}^{1/2}.$$

8. The system of claim 7, wherein said computer is further programmed:

to estimate said ALT error as a distance $\delta(ALT)=|(z_p),(z_{PLAET})|$; and $$\delta(total)=\{\delta(AT)^2+\delta(CT)^2+\delta(ALT)^2\}^{1/2}.$$

\* \* \* \* \*

UNITED STATES PATENT AND TRADEMARK OFFICE
CERTIFICATE OF CORRECTION

| | | |
|---|---|---|
| PATENT NO. | : 7,650,232 B1 | Page 1 of 1 |
| APPLICATION NO. | : 11/239456 | |
| DATED | : January 19, 2010 | |
| INVENTOR(S) | : Russell A. Paielli | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 610 days.

Signed and Sealed this

Twenty-third Day of November, 2010

David J. Kappos
*Director of the United States Patent and Trademark Office*